United States Patent [19]

Lagarde

[11] Patent Number: 5,429,558
[45] Date of Patent: Jul. 4, 1995

[54] PLANETARY REDUCTION GEAR FOR USE WITH TUBULAR MOTORS

[75] Inventor: Eric P. Lagarde, Sallanches, France
[73] Assignee: Somfy, Cluses, France
[21] Appl. No.: 120,166
[22] Filed: Sep. 10, 1993
[30] Foreign Application Priority Data
Sep. 16, 1992 [FR] France .................. 92 11034
[51] Int. Cl.⁶ .................. F16H 7/46; F16H 57/08
[52] U.S. Cl. .................. 475/344; 74/409; 74/462; 475/331; 475/346
[58] Field of Search .......... 74/406, 409, 457, 462; 475/331, 344, 346

[56] References Cited

U.S. PATENT DOCUMENTS 3,178,967 4/1965 Fritsch .................. 475/346
4,901,601 2/1990 Leggat .................. 475/331

FOREIGN PATENT DOCUMENTS 9211034 5/1993 France .
1159718 12/1963 Germany .
1073535 6/1964 United Kingdom .
2148421 5/1985 United Kingdom .
174481 8/1965 U.S.S.R. .

OTHER PUBLICATIONS

Erueka Transfers Technology, No. 7, 11 (1991) Jul., Horton Kirby, Kent GB Daval 'Sliding Planet Gears Provide Optimum Load Sharing'.

*Primary Examiner*—Charles A. Marmor
*Assistant Examiner*—Sherry Estremsky
*Attorney, Agent, or Firm*—Laff, Whitesel, Conte & Saret, Ltd.

[57] ABSTRACT

Planetary reduction gear comprising at least one stage consisting of an input plant pinion (7), of spider gears (8, 9, 10) mounted on a spider (11) secured to an output shaft and to a fixed crown wheel (12). The spider gears are mounted so that they can float radially in the spider and the toothings of the meshing elements are offset such that the radial resultant of the forces exerted, on the one hand, between the crown wheel and the spider gears and, on the other hand, between the spider gears and the planet pinion points either toward the planet pinion in order to reduce the noise of the reduction gear, or toward the weakest elements in order to increase the load capability of the reduction gear.

4 Claims, 2 Drawing Sheets

PLANETARY REDUCTION GEAR FOR USE WITH TUBULAR MOTORS

FIELD OF THE INVENTION

The subject of the present invention is a planetary reduction gear comprising at least one stage consisting of an input planet pinion, of spider gears mounted so that they can float radially on a spider secured to an output shaft and to a fixed crown wheel.

PRIOR ART

Planetary reduction gears, generally with two or three stages, are in particular used in tubular motors intended for driving blinds, roller shutters or doors. Owing to the necessary clearances which they exhibit, these reduction gears are relatively noisy.

Patent GB 1,073,535 discloses planetary gearing in which the spider gears are mounted so that they float radially on the spider. This construction has the purpose of making sure that the spider gears fit themselves to the flanks of the teeth of the crown wheel and of the planet pinion. Gearing of the same type is also described in the journal "EUREKA TRANSFERS TECHNOLOGY" No. 7 of Jun. 11, 1991, page 7. The floating mounting of the spider gears here has the purpose of making sure the load is distributed optimally between the planet pinion and the crown wheel, and of making sure that the teeth are ideally aligned.

Patent SU 174,481 furthermore discloses a planetary reduction gear in which the angle of mesh between the planet pinion and the spider gears is less than the angle of mesh between the crown wheel and the spider gears with the purpose of limiting the load on the spider.

These various measures certainly afford advantages, but do not reduce the noise. What is more, the load capability of the toothings of these reduction gears is not optimized.

In order to be able to reduce the noise or to increase the load capability of planetary reduction gears, it is known to increase the driving ratio of the meshing elements by reducing the operating clearances. This solution has the drawback of being costly, owing to the quality and to the precision which it requires. Indeed, it is necessary for the geometry and the dimensions of the constituent parts to be very precise, because the distances between centers in this type of reduction gear are small and the spindles are located on supports which are independent of one another. This technique finally has limits, because a minimum clearance is indispensable for absorbing the expansions due to heating. Furthermore, since the constituent parts of the reduction gear are generally manufactured by molding, a clearance is necessary to absorb the shrinkage after molding which takes place after a certain length of time. In order to overcome this, it is necessary to proceed with a heat treatment intended to accelerate this shrinkage. It should also be taken into account that it has become general practice to manufacture such reduction gears from plastic, and it is therefore necessary to take into account swelling from taking up moisture.

To the same end, it is known how to use transmissions with helical teeth, but the drawbacks of such transmissions are well known. These are the generation of an axial component which has to be absorbed, the generation of frictional forces which are prejudicial to the efficiency and a more delicate and costly manufacture.

SUMMARY OF THE INVENTION

The invention aims, on the one hand, to reduce the noise and, on the other hand, to increase the load capability of the reduction gear using simple, inexpensive, and easy to control means.

The reduction gear according to the invention is one wherein the teeth of the meshing elements are offset such that the resultant of the forces exerted, on the one hand, between the crown wheel and the spider gears and, on the other hand, between the spider wheels and the planet pinion points in a previously chosen direction.

In this way, the spider gears are naturally pressed either against the planet pinion or against the crown wheel, and the driving ratios between the elements in question have a maximum value.

Since the noise is essentially generated between the planet pinion and the spider gears of the first stage in this type of reduction gear, the noise may be greatly decreased by pointing the radial resultant towards the planet pinion.

By pointing the radial resultant towards the weakest element, the load capability of the reduction gear is increased.

It is not necessary to call upon high production precision and the operational clearances may be appreciably limited, given that the spider gears can float. Gearing with straight-cut toothings may be used. The same spider my receive different satellite gears, which makes it possible to produce several ratios of reduction gear, that is to say several reduction gears.

If the reduction gear includes several stages, it will generally be judicious for the radial resultant to point towards the planetary gear for the first stage, the noise coming mainly from the first stage rotating at high speed, and towards the weakest element, planet pinion or crown wheel, for at least the last stage, the torque transmission capability being limited by that of the last stage. This measure makes it possible both to reduce the noise and to increase the transmission capability of the reduction gear.

According to an advantageous embodiment of the invention, the spider is in the form of a barrel comprising two flanges, the opposite faces of which are traversed by radial grooves in which the spindles of the spider gears may slide freely. Such a spider may be obtained from molding, without rework.

BRIEF DESCRIPTION OF THE DRAWINGS

The appended drawing represents, by way of example, one embodiment of the invention, as well as a variant of the latter.

DESCRIPTION OF THE PREFERRED EMBODIMENT

Figure 1:
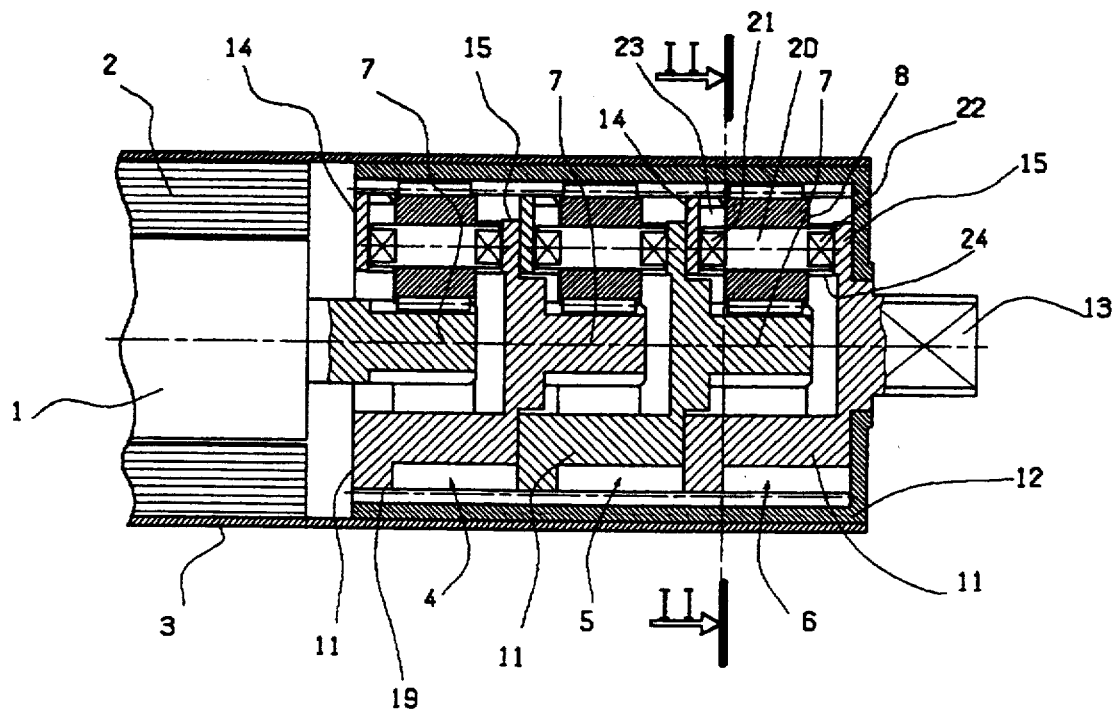
FIG. 1 is a view, in axial section along I—I of FIG. 2, of a planetary reduction gear with three stages, associated with a tubular electric motor.
Figure 2:
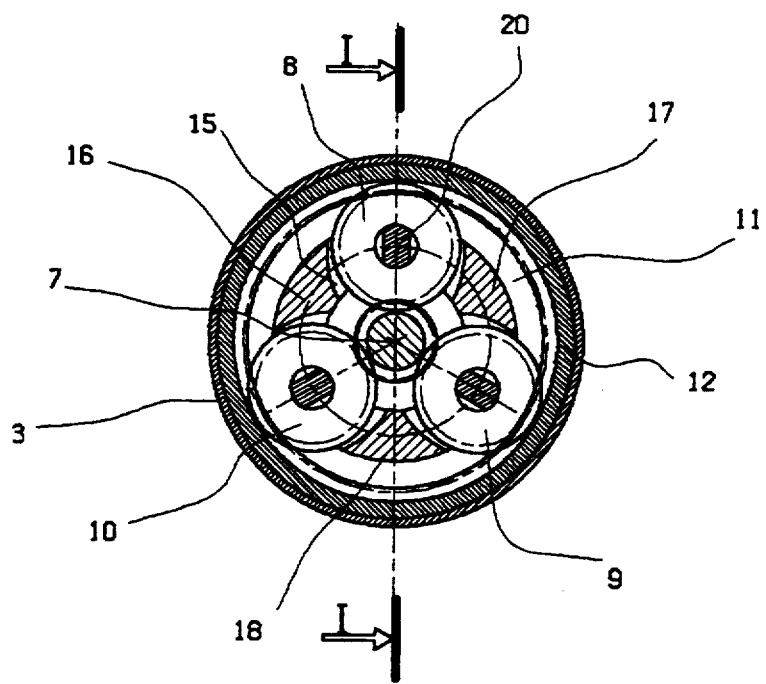
FIG. 2 is a view in transverse section along II—II of FIG. 1.

In FIGS. 1 and 2, a tubular motor comprising a rotor 1 rotating in a stator 2 fixed inside a cylindrical tube 3 can be distinguished partially. A planetary reduction gear with three stages 4, 5, 6 is also mounted in this tube 3. Each of these stages comprises a planet pinion 7 about which rotate three spider gears 8, 9, 10 mounted in a spider 11 and meshing with a tubular crown wheel 12 which is common to the three stages. This crown wheel 12 is fixed to the tube 3. The planet pinion 7 of the first stage 4 consists of an extension of the rotor 1, whereas the planet pinions 7 of the following stages 5 and 6 form part of the spider 11 of the preceding stage. The spider 11 of the third stage 6 has an extension 13 constituting the output shaft of the reduction gear.

Each of the spiders 11 is in the form of a barrel in the form of two parallel circular plates 14 and 15 connected by spacers 16, 17, 18 defining three housings in which the three spider gears 8, 9, 10 are respectively housed. The spider 11 has a circular bearing surface 19 interacting with the crest of the teeth of the toothing of the crown wheel 12 so as to center the spider approximately in the crown wheel 12 while the reduction gear is being mounted in order to facilitate the mounting of the spider in the crown wheel.

The spider gears 8, 9, 10, preferably made from a synthetic material, as is the crown wheel 12, are each mounted so that they can rotate freely on a spindle 20, the ends 21 and 22 of which have parallel planar faces via which the spindle 20 is engaged in two radial grooves 23 and 24 made in each of the plates 14 and 15 of the spider, these grooves opening out both toward the inside and toward the outside of the plates 14 and 15. The spindles 20 can slide freely in these grooves, such that the spider gears 8, 9, 10 are mounted so that they can float radially in their spider, the spindles 20 of the spider gears, however, being prevented from rotating such that the rotation of the spider gears takes place between the spider gears and their spindles.

The toothings of the meshing elements of the reduction gear, that is to say of the planet pinions, of the spider gears and of the crown wheel, are offset such that for each of the spider gears the radial resultant of the forces exerted, on the one hand, between the crown wheel 12 and the spider gear and, on the other hand, between the spider gear and the planet pinion 7 points toward the planet pinion for the first stage, which rotates more rapidly, and toward the weakest meshing element, in this case the crown wheel 12, for the third stage. As regards the second stage, said resultant could point either toward the planet pinion or toward the weakest meshing element, planet pinion or crown wheel, depending on the priority given to decreasing the noise or to increasing the load, the fact of having the spider gears floating and one resultant pointing toward the planet pinion having the effect of decreasing the noise of the reduction gear, whereas the resultant pointing toward the weakest meshing element, in this case the crown wheel, makes it possible to increase the load, that is to say the transmission capability of the reduction gear. Thus, the spider gears of the first stage 4 are naturally pressed against the planet pinion. Since the noise is essentially generated between the planet pinion and the spider gears of the rapidly rotating first stage, it is decreased by eliminating the clearance.

The spider gears of the last stage 6 are, in contrast, pressed against the crown wheel 12 and the driving angles between the spider gears and the crown wheel have a maximum value which makes it possible to increase the transmission capability, that is to say the load on the output shaft 13.

Figure 3:
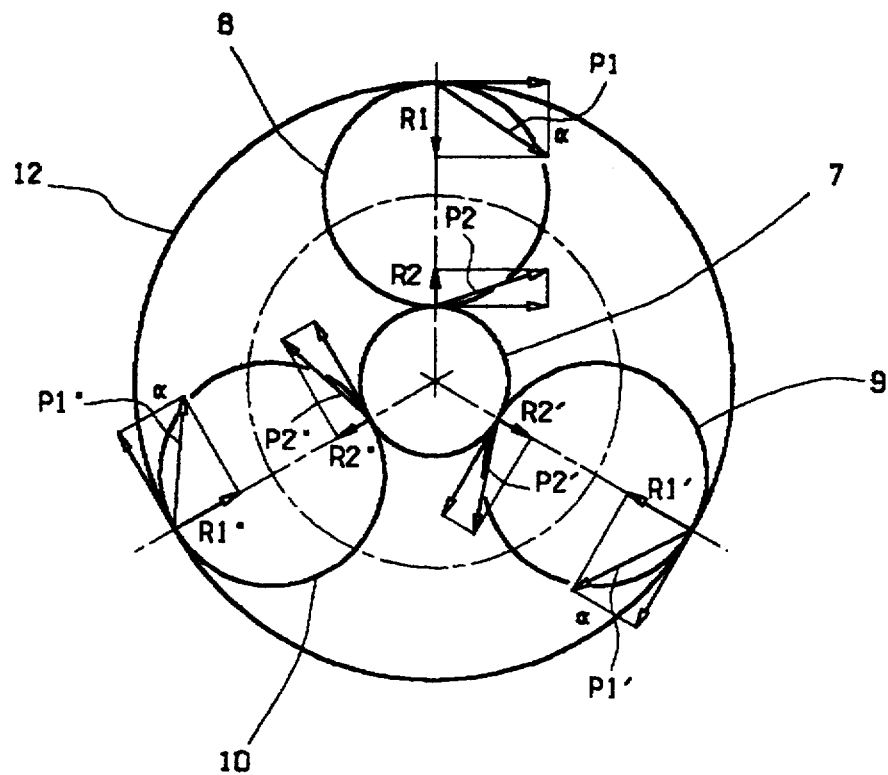
FIG. 3 represents the operating pressure angles and the pressure forces in the first stage of the reduction gear.

FIG. 3 represents the operational pressure angles $\alpha$ and the forces P generated by the operating pressure of the toothings in one another, for the first stage 4. On the subject of the offset toothings and of the operating pressure angle $\alpha$ reference will be made, for example, to "G. HENRIOT, TRAITE THEORIQUET PRATIQUE DES ENGRENAGES [THEORETICAL AND PRACTICAL TREATISE ON GEARS]" and it will be recalled that the operating pressure angle $\alpha$ increases if the sum of the offsets of the meshing elements is positive and decreases if the offset is negative. As can be seen in FIG. 3, the angle $\alpha$ determines the direction of the operating pressure forces $P1$, $P1'$, $P1''$ between the spider gears and the crown wheel, and $P2$, $P2'$ and $P2''$ between the spider gears and the planet pinion.

In the case of FIG. 3, the toothings are offset such that, for each of the spider gears, the radial component $R1$ of the force $P1$ is greater than the component $R2$ of the force $P2$, that is to say that the resultant of $R1$ and $R2$ points toward the planet pinion 7. Likewise, $R1'$ is greater than $R2'$, and $R1''$ is greater than $R2''$.

This result may, of course, be obtained by offsetting all the toothings or just part of these toothings.

Figure 4:
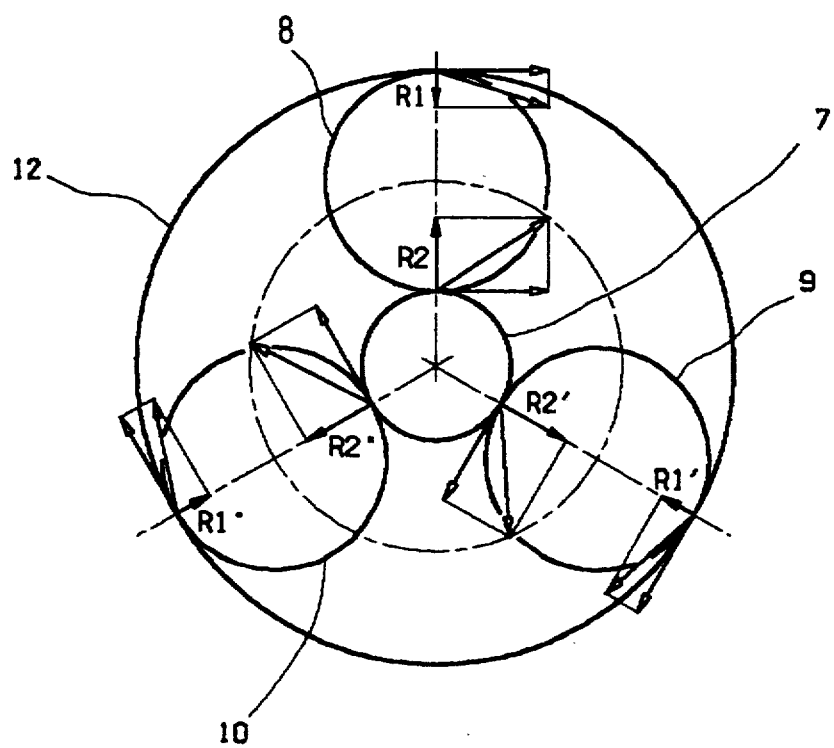
FIG. 4 represents the operating pressure angles and the pressure forces in the last stage of the reduction gear.

FIG. 4 illustrates the operating pressure angles and the radial components in the last stage of the reduction gear. It is still assumed that the crown wheel 12 constitutes the weakest element. In this case, we have $R2$ greater than $R1$, $R1'$ greater than $R2'$, $R2''$ greater than $R1''$, such that the floating spider gears 8, 9, 10 are pressed against the toothing of the crown wheel 12.

According to an embodiment variant of the spider, the spindle 20, instead of being held axially by grooves, could pass through the two plates 14 and 15 of the spider through two radial slots and be held axially by means of circlips.

The invention is applicable to a reduction gear including a single stage or a number of stages other than three. In the case of a reduction gear with just one stage, this stage will be considered either to be a first stage or to be a last stage according to whether the result in question is of priority.

Within the scope of a reduction gear with several stages, the intermediate stages could be produced either like the first stage or like the last stage, according to whether the result in question is of priority.

I claim:

1. A planetary reduction gear comprising several stages (4, 5, 6), each stage including an input planet pinion and a set of spider gears (8, 9, 10) mounted so they can float radially on a spider (11), said spider (11) being secured to an output shaft (13) and bearing on a fixed crown wheel (12), at least a first stage of said several stages, having toothings of the meshing elements offset such that a radial resultant of the forces exerted, on the one hand, between the crown wheel and the spider gears and, on the other hand, between the spider gears and the planet pinion points towards the planet pinion, and at least a last stage, of said several stages, having toothings of the meshing elements offset such that said radial resultant of the forces exerted, points towards the weakest meshing element.

2. The reduction gear as claimed in claim 1, wherein the spider (11) is in the form of a barrel comprising two flanges (14, 15), the opposite faces of which are traversed by radial grooves (23, 24) in which the spindles (20) of the spider gears may slide freely.

3. The reduction gear as claimed in claim 1, wherein the spindles (20) of the spider gears have, at least at one of their ends, flats (21) which interact with the flanks of the groove (23) to prevent the spindles from rotating with the spider gears.

4. The reduction gear as claimed in claim 1, wherein the spiders have a cylindrical bearing surface (19) for centering in the crown wheel (12).

* * * * *